United States Patent [19]

Shankar et al.

[11] Patent Number: 5,436,860
[45] Date of Patent: Jul. 25, 1995

[54] COMBINED MULTIPLIER/SHIFTER AND METHOD THEREFOR

[75] Inventors: Ravi Shankar; Ana S. Leon; Kin K. Chau-Lee, all of Austin, Tex.

[73] Assignee: Motorola, Inc., Schaumburg, Ill.

[21] Appl. No.: 249,519

[22] Filed: May 26, 1994

[51] Int. Cl.[6] .......................... G06F 7/52; G06F 7/00
[52] U.S. Cl. .................. 364/757; 364/715.08; 364/754
[58] Field of Search ............... 364/754, 757, 758, 759, 364/760, 715.01, 715.08

[56] References Cited

U.S. PATENT DOCUMENTS

| | | | |
|---|---|---|---|
| 4,031,377 | 7/1977 | Deutsch et al. | 364/757 |
| 4,546,446 | 10/1985 | Machida | 364/759 |
| 4,575,812 | 3/1986 | Kloker et al. | 364/760 |
| 4,872,128 | 10/1989 | Shimizu | 364/715.08 |
| 4,887,232 | 12/1989 | Wolrich et al. | 364/754 |
| 5,099,445 | 3/1992 | Studor et al. | 364/715.08 |
| 5,218,564 | 6/1993 | Covey | 364/750.5 |
| 5,282,153 | 1/1994 | Bartkowiak et al. | 364/715.08 X |
| 5,309,382 | 5/1994 | Tamura et al. | 364/715.08 |

OTHER PUBLICATIONS

Motorola, Inc.; "DSP56116 Digital Signal Processor User's Manual;" Section 3; pp. 3-1-14 (1990).

Primary Examiner—Roy N. Envall, Jr.
Assistant Examiner—Chuong D. Ngo
Attorney, Agent, or Firm—Paul J. Polansky

[57] ABSTRACT

A combined multiplier/shifter (150) uses an existing high-speed multiplier to perform both multiplies and programmable left and right shifts without a dedicated high-speed shifter. A shift decoder (160) used in a shift mode provides first recoded signals according to a shift count and a shift direction. A recoder (161) recodes a multiplier input in a multiply mode to provide second recoded signals. A multiplier array (163) receives either a multiplicand or a shift operand at its multiplicand input, and uses either the first or second recoded signals selectively according to the mode. An output of the multiplier array (163) is either a product in the multiply mode or a first shift result in the shift mode. An output shifter (157) selectively adjusts the first shift result according to the shift direction to provide a second, final shift result.

20 Claims, 5 Drawing Sheets

COMBINED MULTIPLIER/SHIFTER AND METHOD THEREFOR

CROSS REFERENCE TO RELATED, COPENDING APPLICATION

Related subject matter is contained in a copending patent application, Ser. No. 08/249,505 entitled "Multibit Shifting Apparatus, Data Processor Using Same, and Method Therefor", by Joseph P. Gergen and Kin Ki Chau-Lee, filed of even date herewith, and assigned to the assignee hereof.

FIELD OF THE INVENTION

This invention relates generally to data processing systems, and more particularly, to arithmetic circuits with shift capabilities.

BACKGROUND OF THE INVENTION

A data processor requires a variety of shift operations to implement its instruction set. The shift operations can include left shifts, right shifts, and rotates. The shifts can be arithmetic or logical, which determines how bits at either end of the operand are handled. Each shift or rotate operation has a variable length. Which bit is shifted into a given bit position is determined by the type of shift operation. There is generally a tradeoff involved in designing circuitry to implement shift and rotate operations on an operand. The area on the integrated circuit used for the circuitry to perform the operations affects the performance of the operation, measured in number of clock cycles to complete the operation.

At one extreme, a barrel shifter performs a full matrix of operations on an operand. For example, if the barrel shifter is 32 bits wide, each of the 32 bits is selectively coupled directly to each of the other 31 bits. Which bits are coupled together for an operation is determined by the length and direction of the operation being performed. The barrel shifter maximizes the performance of the shifter, but also consumes a maximum of space. At the other extreme, a simple shifter shifts only one bit at a time. To implement shifts of larger lengths, a control section must use consecutive one-bit shift operations until the specified length is reached. This type of shifter uses much less area than the barrel shifter, but performance is greatly diminished. An intermediate shifter was taught by Chas F. Studor and Robert Skruhak in U.S. Pat. No. 5,099,445. This shifter performs left and right shifts not only by one, but also by an arbitrary number, such as four, to provide a good compromise between size and speed. However, the area-speed tradeoff remains a significant problem in data processor design.

G. Wolrich et al. in U.S. Pat. No. 4,887,232 entitled "Apparatus and Method for Performing a Shift Operation in a Multiplier Array Circuit" disclose a shift apparatus for aligning operands in a floating point system prior to addition or subtraction. Wolrich et al. make use of an existing array multiplier to perform this denormalization shift quickly without an additional shifter such as a barrel shifter. The apparatus disclosed by Wolrich et al. is used only for denormalization shifts and thus only programmably performs right shifts. What is needed, however, is a shifting apparatus which both consumes very little circuit area and also is able to perform all needed shift operations.

SUMMARY OF THE INVENTION

Accordingly, the present invention provides, in one form, a combined multiplier/shifter, including first and second inputs, first and second recoding circuits, and a multiplier array. The first input receives a first operand, which is a multiplicand in a multiply mode and a shift operand in a shift mode. The second input receives a second operand, which is a multiplier in the multiply mode, and a shift count in the shift mode. The first recoding circuit is coupled to the second input and is responsive to a plurality of groups of bits of the second operand and provides a corresponding plurality of first groups of recoded signals. Each first group of recoded signals indicates one of a first predetermined number of recoding states determined by values of corresponding bits of the second operand. The second recoding circuit is coupled to the second input and is responsive to the plurality of groups of bits of the second operand and provides a second corresponding plurality of groups of recoded signals. Each second group of recoded signals indicates one of a second predetermined number of recoding states determined by values of corresponding bits of the second operand. The second predetermined number is less than the first predetermined number. The multiplier array has a multiplicand input for receiving the first operand, a multiplier input for receiving either the plurality of first groups of recoded signals in the multiply mode, or the plurality of second groups of recoded signals in the shift mode, and an output for providing a product of the first and second inputs thereof. The combined multiplier/shifter provides the output of the multiplier array as a product of the multiplier and the multiplicand in the multiply mode, and as a first shift result in the shift mode.

In another form, the present invention provides a method for performing both multiply and shift operations using a multiplier array. A first operand is provided to a multiplicand input of the multiplier array and represents a multiplicand in a multiply mode and a shift operand in a shift mode. A second operand representing a multiplier in the multiply mode and a shift count in the shift mode is received. The multiplier is recoded in the multiply mode to provide a first plurality of groups of recoded signals each indicating one of a first predetermined number of recoding states. The shift count is recoded in the shift mode to provide a second plurality of groups of recoded signals each indicating one of a second predetermined number of recoding states. The second predetermined number is less than the first predetermined number. A third plurality of groups of recoded signals each indicating one of a third predetermined number of recoding states is provided to a recoded signal input of the multiplier array in response to either the first plurality of groups of recoded signals in the shift mode, or the second plurality of groups of recoded signals in the multiply mode. An output of the multiplier array is provided as a product in the multiply mode and as a first shift result in the shift mode.

These and other features and advantages will be more clearly understood from the following detailed description taken in conjunction with the accompanying drawings.

DETAILED DESCRIPTION OF A PREFERRED EMBODIMENT

Figure 1:
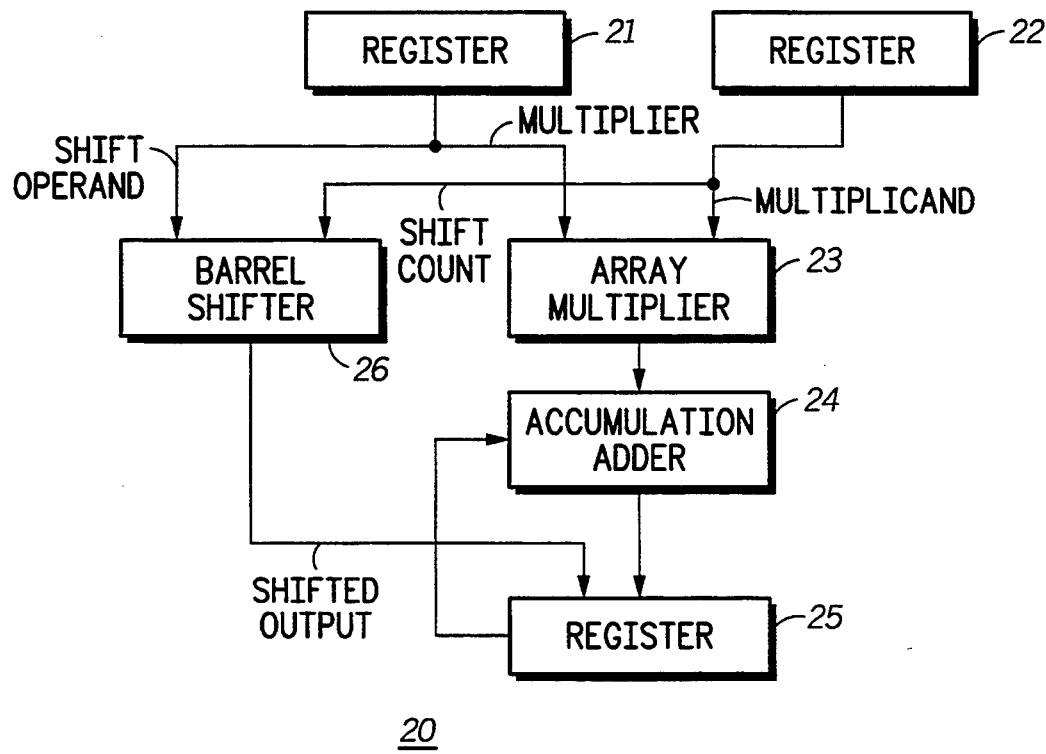
FIG. 1 illustrates in block diagram form an arithmetic logic unit (ALU) according to the prior art.

FIG. 1 illustrates in block diagram form an arithmetic logic unit (ALU) 20 according to the prior art. ALU 20 includes registers 21 and 22 for storing operands. ALU 20 includes an array multiplier 23 which receives these two operands during a multiply instruction. When presented to multiplier 23, these two operands are labelled "MULTIPLIER" and "MULTIPLICAND", respectively. Array multiplier 23 is a conventional array multiplier such as a modified Booth's multiplier, a Wallace Tree, or the like. In the case of a modified Booth's multiplier, a series of modified Booth's recoders (not shown) receives corresponding groups of three multiplier bits and recodes them to provide signals to an array of array multiplier 23. The multiplicand signals are then routed to multiplexers in the array to select partial products according to conventional modified Booth's recoding, i.e., 0, ±1, and +2 times the multiplicand. The outputs of the multiplexers are then summed to provide the final sum, which is a product of the multiplier and the multiplicand.

Array multiplier 23 provides this product as an output signal to an accumulation adder 24. Accumulation adder 24 has an input for receiving a prior sum which it adds to the product and in turn provides this sum as an output to a register 25. Register 25 is a read/write register, which has an output which is connected back to an input of accumulation adder 24. Thus ALU 20 allows multiply-and-accumulate (MAC) instructions. ALU 20 also includes a barrel shifter 26 to implement shift instructions. Barrel shifter 26 has a first input connected to the output of register 21 for receiving a quantity labelled "SHIFT OPERAND", a second input connected to the output of register 22 for receiving a quantity labelled "SHIFT COUNT", and an output for providing a quantity labelled "SHIFTED OUTPUT" as an output thereof. Barrel shifter 26 also receives other control signals (not shown) to determine the type of shift operation.

Barrel shifter 26 can shift any bit of the SHIFT OPERAND into any other bit position as determined by the type of shift operation and the SHIFT COUNT. Barrel shifter 26 requires only a small propagation delay which usually is within a single clock cycle of the data processor. To achieve this flexibility, however, barrel shifter 26 includes a large array of transistors forming selectable connections between each bit position and every other bit position. Since it requires a large number of transistors, barrel shifter 26 consumes a large amount of integrated circuit area, as well as a significant amount of power. It would be desirable to achieve the high speed of barrel shifter 26 without the cost of the additional circuit area and power.

Figure 2:
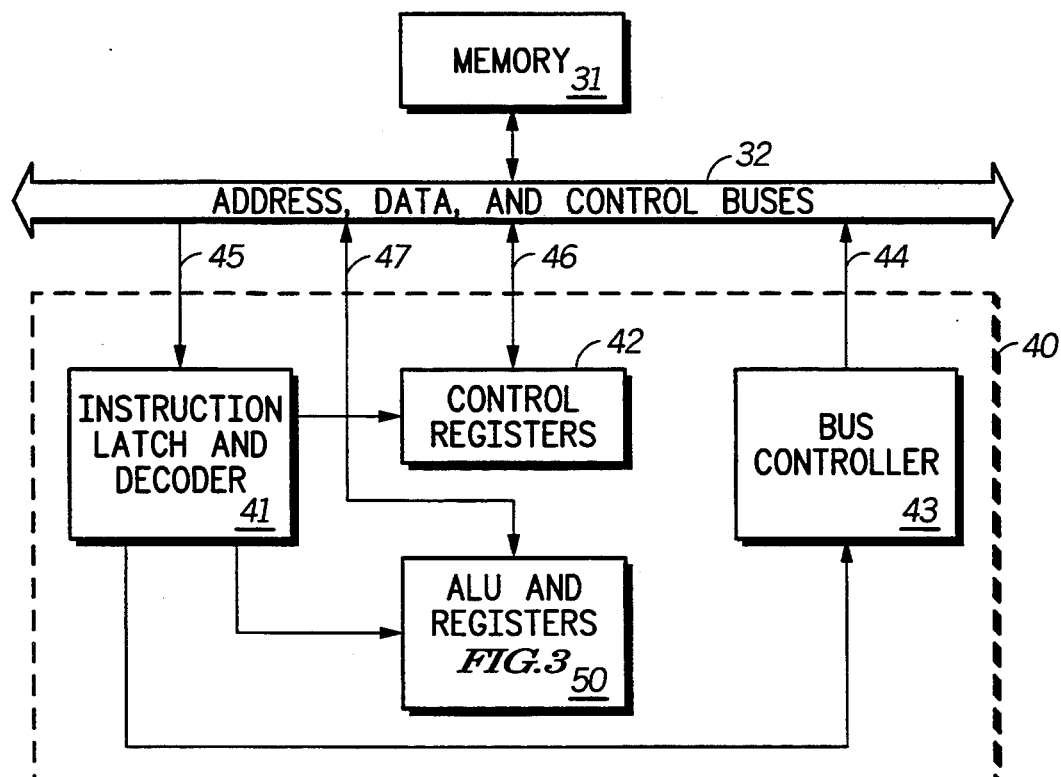
FIG. 2 illustrates a data processing system including a data processor according to the present invention.

FIG. 2 illustrates a data processing system 30 including a data processor 40 according to the present invention. Data processing system 30 includes a memory 31 for storing program and data elements, and may include both random access memory (RAM) and nonvolatile memory. Memory 31 is accessed through a general-purpose bus 32 which conducts address, control, and data signals into and out of memory 31, as appropriate.

Data processor 40 is connected to memory 31 via bus 32, and includes generally an instruction latch and decoder 41, a control registers block 42, a bus controller 43, and ALU and registers block 50, referred to simply as ALU 50. Other conventional data processor blocks such as address generation units (AGUs), peripherals, and the like are not necessary to understand the present invention and are well known in the art, and thus are omitted from FIG. 2. Bus controller 43 accesses a program stored in memory 31 by providing control signals 44 to bus 32. During instruction fetches, control registers 42 provide an address, such as a program counter address for instruction fetching, via bidirectional signal lines 46. In response, memory 31 provides a data element stored at the accessed address. Instruction latch and decoder 41 receives this data element via an input data path 45. Instruction latch and decoder 41 then decodes the instruction and provides corresponding control signals to the other blocks of data processor 40. In the illustrated embodiment, instruction latch and decoder 41 supports an instruction set of data processor 40 by directly decoding selected bit fields which determine the type of instruction, the registers involved, the memory addressing modes, etc. In other embodiments, instruction latch and decoder 41 may receive an instruction which includes a starting address of an internal microcode routine for performing the instruction.

Instruction latch and decoder 41 provides appropriate control signals to execute the received instructions. Control registers block 42 receives one set of these control signals and includes registers, such as the program counter, for use in controlling data processor 40. Control registers block 42 has a bidirectional connection 46 to bus 32 for providing address signals and for conducting data to and from bus 32. Control registers block 42 also provides control signals to bus 32. Bus controller 43 receives another set of control signals from instruction latch and decoder 41 and provides control signals 44 to bus 32 to fetch instructions, store and retrieve data, etc., as determined by the instruction flow. ALU 50 receives yet another set of control signals from instruction latch and decoder 41, and includes a register set for instruction execution. ALU 50 has a connection 47 to bus 32 for conducting data to and from bus 32 and for providing addresses to bus 32. ALU 50 performs multiple arithmetic operations to support the instruction set of data processor 40, including addition, subtraction, multiplication, multiply-and-accumulate (MAC), and left and right shift instructions. As used herein, a left shift indicates an operation to shift bits into more significant bit positions, whereas a right shift indicates an operation to shift bits into less significant bit positions.

In general, it is desirable for data processor 40 to minimize the circuit area required to implement its instruction set. One of the largest blocks of data processor 40 is ALU 50 which has dedicated hardware for performing the arithmetic operations in response to corresponding instructions of the instruction set. However, ALU 50 requires less circuit area than ALU 20 of FIG.

1 by eliminating the need for a dedicated shift circuit such as barrel shifter 26. To eliminate the need for the dedicated shift circuit, instruction latch and decoder 41 provides control signals to ALU 50 to perform programmable, multibit left and right shifts in other existing hardware in ALU 50.

Figure 3:
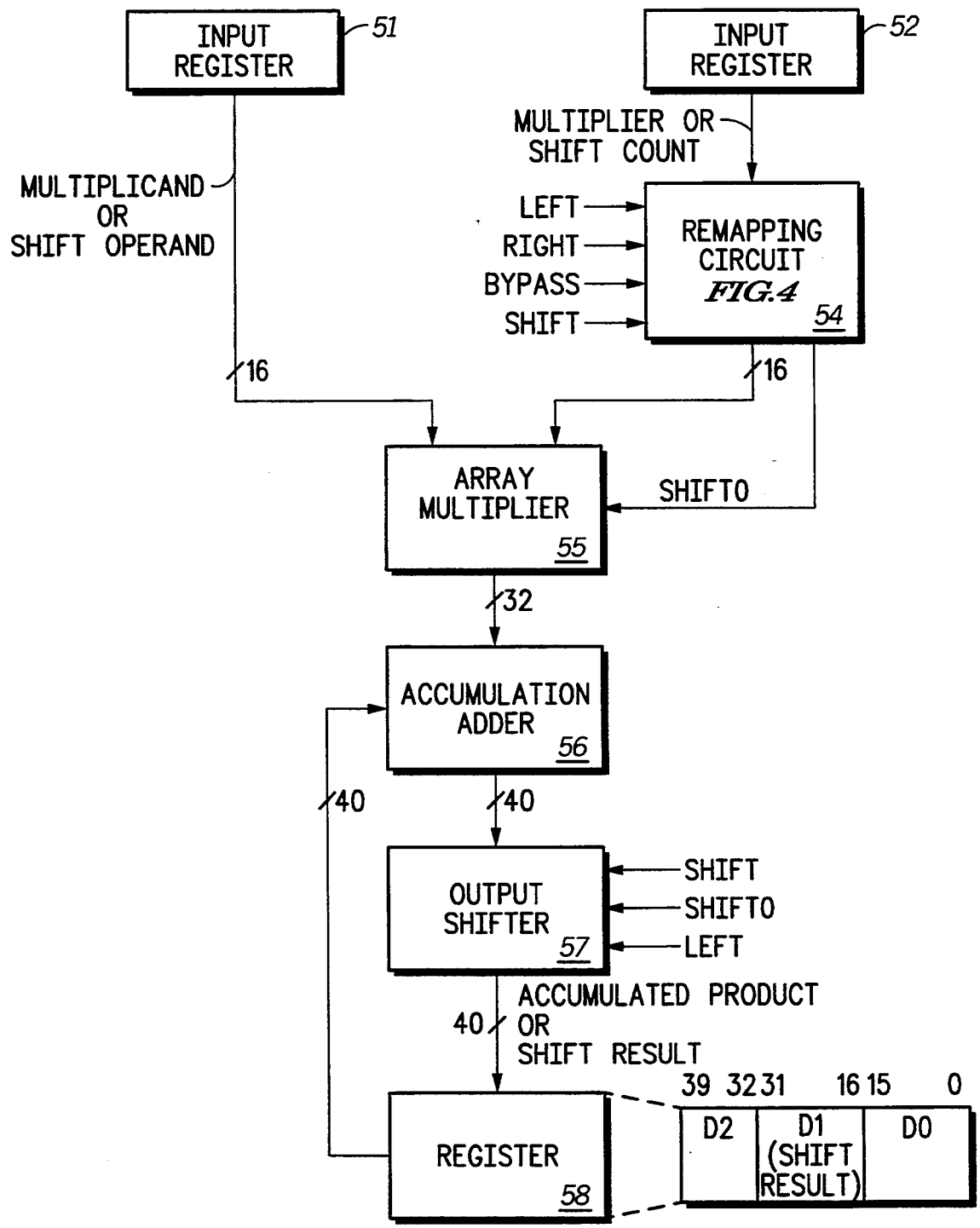
FIG. 3 illustrates in block diagram form an ALU according to one embodiment of the present invention.

This feature will be more clearly understood with reference to FIG. 3, which illustrates in block diagram form one embodiment of ALU 50 of FIG. 2. ALU and registers block 50 includes two input registers 51 and 52 for receiving input data. Input register 51 stores a data element referred to as "MULTIPLICAND" during a multiplication operation or "SHIFT OPERAND" during a shift operation. Input register 52 stores a data element referred to as "MULTIPLIER" during a multiplication operation or "SHIFT COUNT" during a shift operation. In the illustrated embodiment, ALU 50 is operative on 16-bit data words, and thus registers 51 and 52 are each 16-bit registers.

A 16-bit output of register 52 is provided to an input of a remapping circuit 54. Remapping circuit 54 is selectively operative in response to control signals labelled "LEFT", "RIGHT", "BYPASS", and "SHIFT". Signals LEFT and RIGHT together indicate the shift direction, and could be represented by just a single signal as well. In response to a shift instruction, instruction latch and decoder 41 of FIG. 2 activates signal LEFT at a logic high to indicate a left shift, and signal RIGHT at a logic high to indicate a right shift. During an instruction other than a shift, instruction latch and decoder 41 activates signal BYPASS at a logic high to cause remapping circuit 54 to pass the input to the output without remapping, i.e., to bypass the remapping function. During a shift instruction, signal BYPASS is inactive at a logic low. Thus, signal BYPASS indicates the operation mode of ALU 50. Remapping circuit 54 also detects a condition in which, during a shift instruction, the SHIFT COUNT is equal to zero, and provides an output signal labelled "SHIFT0" in response to detecting this condition.

Multiplier 55 is a 16-by-16 array multiplier. Specifically, multiplier 55 is a modified Booth's multiplier which sums partial products through a carry/save adder tree. However, other types of array multipliers are possible, such as one which sums partial products through a Wallace Tree. The important consideration is that multiplier 55 is relatively fast: for the illustrated example, multiplier 55 provides a product of a first input and a second input thereof in one clock cycle of data processors 40. Multiplier 55 has a 16-bit multiplicand input terminal coupled to an output terminal of register 51, a 16-bit multiplier input terminal coupled to an output terminal of remapping circuit 54, a control input terminal for signal SHIFT0, and a 32-bit output terminal for providing a product of the multiplier and multiplicand inputs.

Signal SHIFT0 causes multiplier 55 to pass the multiplicand input through to the 32-bit output terminal as follows. The direct result of multiplying two 16-bit two's complement numbers is a 32-bit number with two sign bits and thirty mantissa bits. Multiplier 55, however, provides an output which includes only one sign bit in the most significant bit position, followed by thirty mantissa bits, with a zero placed in the least significant bit position. Thus, in response to signal SHIFT0, the sixteen bits of the multiplicand input are aligned into bit positions 16:1 with bit 0 set to zero.

The illustrated data processor is a digital signal processor (DSP). In signal processing algorithms, such as finite impulse response (FIR) filters, infinite impulse response (IIR) filters, fast Fourier transforms (FFTs), and the like, it is helpful to have the capability to perform a multiply-and-accumulate (MAC) instruction using hardware. For this purpose, ALU 50 includes an accumulation adder 56 which accumulates sums of products efficiently for such instructions. Accumulation adder 56 has a 32-bit input terminal connected to the output terminal of multiplier 55 for receiving a first addition operand, a second, 40-bit input terminal for receiving a second addition operand, and an output terminal for providing a 40-bit sum thereof. This sum represents a first shift result in the shift mode, or an accumulated product in the multiply mode. In order to accommodate accumulations which cannot be represented in 32 bits, accumulation adder 56 includes eight extra bits located as most significant bits to function as guard bits against overflow.

An output shifter 57 has a 40-bit input terminal connected to the output terminal of accumulation adder 56, control input terminals for receiving signals LEFT, SHIFT, and SHIFT0, and a 40-bit output terminal for providing a data element labelled "ACCUMULATED PRODUCT" for multiplication or MAC operations, or a second shift result labelled "SHIFT RESULT" during shift operations. A register 58 has an input terminal connected to the output terminal of output shifter 57, and an output terminal connected to the second input terminal of accumulation adder 56. FIG. 3 omits additional connections to bus 32 of FIG. 2. During a shift operation according to the present invention, bits 31–16 of the output of accumulation adder 56 store the result of a right shift, while bits 15–0 store the result of a left shift. Output shifter 57 additionally performs a fixed, 15-bit left shift to align the SHIFT RESULT in a common location, i.e., in bits 31:16 of register 58. In other embodiments, however, output shifter 57 may be omitted.

ALU 50 uses array multiplier 55 to perform fully programmable left and right shift operations. These shift operations are performed at the same speed as the multiplications, and thus approximately as fast as a barrel shifter. However, because array multiplier 55 is already present to perform multiply instructions, ALU 50 avoids the need for a dedicated barrel shifter. Thus, data processor 40 requires less circuit area than known data processors with barrel shifters, or conversely, data processor 40 performs shift operations faster than other data processors which do not have high-speed shifting circuitry.

Figure 4:
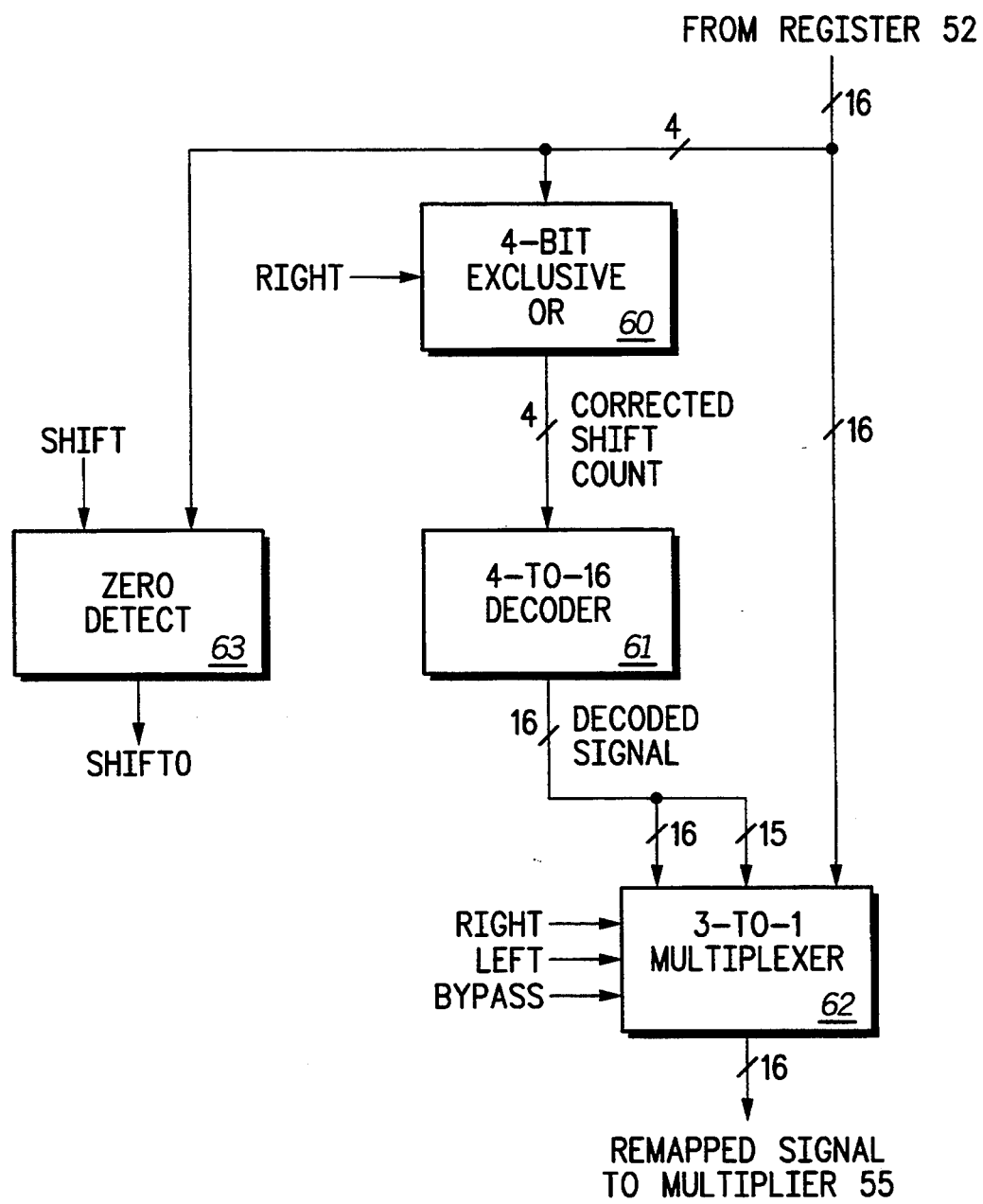
FIG. 4 illustrates in block diagram form the remapping circuit of FIG. 3.

FIG. 4 illustrates in block diagram form remapping circuit 54 of FIG. 3. Remapping circuit 54 includes generally a 4-bit exclusive-OR block 60, a 4-to-16 decoder 61, a 3-to-1 multiplexer 62, and a zero detect circuit 63. Exclusive-OR block 60 includes four exclusive-OR gates corresponding to the four least significant bit positions of the output of multiplier register 52 of FIG. 3. In the case of a shift operation, these four least-significant bit positions form the SHIFT COUNT for the shift operation. Each of the four exclusive-OR gates has a first input for receiving a corresponding one of these four least significant bits from multiplier register 52, a second input for receiving control signal RIGHT, and an output terminal. The exclusive-OR function is equivalent to a controlled inversion based on the value of signal RIGHT. If RIGHT is active at a logic high (right shift), 4-bit exclusive-OR block 60 inverts the multiplier bits. If signal RIGHT is inactive at a logic low (left shift), 4-bit exclusive-OR block 60 passes the SHIFT COUNT bits uninverted.

Decoder 61 decodes the 4-bit CORRECTED SHIFT COUNT to provide a 16-bit "DECODED SIGNAL". The DECODED SIGNAL has only one bit position which is a binary one, corresponding to the value of the CORRECTED SHIFT COUNT. All additional bits are binary zeros. Multiplexer 62 has a first input for receiving the 16-bit DECODED SIGNAL, a second input which receives the DECODED SIGNAL shifted right by one bit position, a third input coupled to the output of register 52, control inputs for receiving control signals RIGHT, LEFT, and BYPASS, and an output for providing a 16-bit "REMAPPED SIGNAL". Signals RIGHT, LEFT, and BYPASS select the first, second, or third inputs of multiplexer 62, respectively. Note that right-shifting a 16-bit quantity by one means shifting the fifteen most-significant bits into adjacent, less-significant bit positions, with the sign bit copied into the most-significant bit position. Thus, ALU 50 of FIG. 3 supports an arithmetic shift instruction. In other embodiments, an ALU according to the present invention could support logical shifts by filling vacated bit positions with zeros for right shifts. Note that for both arithmetic and logical left shifts, vacated bit positions are filled with zeros. Zero detect circuit 63 is operative in response to signal SHIFT to detect all zeros in the 4-bit SHIFT COUNT and to activate signal SHIFT0 in response.

Instruction latch and decoder 41 of FIG. 2 deactivates signal BYPASS at a logic low in response to a shift instruction, and activates signal BYPASS at a logic high otherwise. Instruction latch and decoder 41 activates signal RIGHT at a logic high in response to a right shift instruction, and keeps signal RIGHT inactive at a logic low otherwise. Instruction latch and decoder 41 activates signal LEFT at a logic high in response to a left shift instruction, and keeps signal LEFT inactive at a logic low otherwise.

By using remapping circuit 54 to remap an input shift count, ALU 50 allows the use of multiplier 55 for both left and right shifts without using a dedicated shift circuit, such as a barrel shifter. Thus, ALU 50 accomplishes all needed shifts with very little added circuit area.

The operation of remapping circuit 54 is described for right and left shifts as specified in TABLEs I and II, respectively, where the $ symbol represents a number in hexadecimal format.

TABLE I

| RIGHT SHIFT COUNT | XOR 60 OUTPUT | DECODER 61 OUTPUT | MUX 62 OUTPUT |
| --- | --- | --- | --- |
| 0 | 15 | $8000 | $8000 |
| 1 | 14 | $4000 | $4000 |
| 2 | 13 | $2000 | $2000 |
| 3 | 12 | $1000 | $1000 |
| 4 | 11 | $0800 | $0800 |
| 5 | 10 | $0400 | $0400 |
| 6 | 9 | $0200 | $0200 |
| 7 | 8 | $0100 | $0100 |
| 8 | 7 | $0080 | $0080 |
| 9 | 6 | $0040 | $0040 |
| 10 | 5 | $0020 | $0020 |
| 11 | 4 | $0010 | $0010 |
| 12 | 3 | $0008 | $0008 |
| 13 | 2 | $0004 | $0004 |
| 14 | 1 | $0002 | $0002 |

TABLE I-continued

| RIGHT SHIFT COUNT | XOR 60 OUTPUT | DECODER 61 OUTPUT | MUX 62 OUTPUT |
| --- | --- | --- | --- |
| 15 | 0 | $0001 | $0001 |

TABLE II

| LEFT SHIFT COUNT | XOR 60 OUTPUT | DECODER 61 OUTPUT | MUX 62 OUTPUT |
| --- | --- | --- | --- |
| 0 | 0 | $0001 | $0000 |
| 1 | 1 | $0002 | $0001 |
| 2 | 2 | $0004 | $0002 |
| 3 | 3 | $0008 | $0004 |
| 4 | 4 | $0010 | $0008 |
| 5 | 5 | $0020 | $0010 |
| 6 | 6 | $0040 | $0020 |
| 7 | 7 | $0080 | $0040 |
| 8 | 8 | $0100 | $0080 |
| 9 | 9 | $0200 | $0100 |
| 10 | 10 | $0400 | $0200 |
| 11 | 11 | $0800 | $0400 |
| 12 | 12 | $1000 | $0800 |
| 13 | 13 | $2000 | $1000 |
| 14 | 14 | $4000 | $2000 |
| 15 | 15 | $8000 | $4000 |

Numerical examples for left and right shifts are useful in understanding the operation of remapping circuit 54. Referring now to FIGS. 3 and 4 together, consider the case of a right shift of 2 (SHIFT COUNT=2) on a SHIFT OPERAND of $8421. A correct SHIFT RESULT would be $E108. Register 51 provides $8421 as the SHIFT OPERAND at its output to the multiplicand input of multiplier 55. Register 52 provides a SHIFT COUNT of 2, encoded on the four LSBs of the output of register 52 as 0010 binary, to the input of remapping circuit 54. Because it is a right shift, signal RIGHT is active and signals LEFT and BYPASS are inactive. 4-bit exclusive-OR circuit 60 inverts each bit to provide a CORRECTED SHIFT COUNT value of 13, or 1101 binary, to the input of decoder 61. Decoder 61 then provides a value of 0010000000000000 binary ($2000) as the DECODED SIGNAL. In response to the activation of signal RIGHT, multiplexer 62 selects the second input thereof, and provides a value of $4000 as the REMAPPED SIGNAL to the multiplier input of multiplier 55. Multiplier 55 then multiplies $8421 by $4000 to provide a 32-bit output of $E108 0000, which becomes a 40-bit value of $FF E108 0000 in accumulation adder 56. Output shifter 57 passes the input to the output unchanged in response to signal SHIFT being active and signals SHIFT0 and LEFT being inactive. Thus, a value of $E108 is aligned into bits 31:16 of register 58, which is the expected SHIFT RESULT.

Now consider the case of a left shift of 2 (SHIFT COUNT=2) on the SHIFT OPERAND of $8421. A correct SHIFT RESULT would be $1084. Register 51 provides $8421 as the SHIFT OPERAND at its output to the multiplicand input of multiplier 55. Register 52 provides a SHIFT COUNT of 2, encoded on the four LSBs of the output of register 52 as 0010 binary, to the input of remapping circuit 54. Because it is a left shift, signal LEFT is active and signals RIGHT and BYPASS are inactive. 4-bit exclusive-OR circuit 60 passes each bit unaltered to provide a CORRECTED SHIFT COUNT value of 2, or 0010 binary, to the input of decoder 61. Decoder 61 then provides a value of 0000000000000100 binary ($0004) as the DECODED SIGNAL. In response to the activation of signal LEFT, multiplexer 62 selects the second input thereof, and provides a value of $0002 as the REMAPPED SIGNAL to the multiplier input of multiplier 55. Multiplier 55 then multiplies $8421 by $0002 to provide a 32-bit output of $0002 1084, which becomes a 40-bit value of $00 0002 1084 in accumulation adder 56. Output shifter 57 then shifts this value fifteen bits to the left in response to signals SHIFT and LEFT being active and signal SHIFT0 being inactive. Thus, a value of $1084 is aligned into bits 31:16 of register 58, which is the expected SHIFT RESULT.

Finally, consider the case of a left shift of 0 (SHIFT COUNT=0) on the SHIFT OPERAND of $8421. A correct SHIFT RESULT would be $8421. Register 51 provides $8421 as the SHIFT OPERAND at its output to the multiplicand input of multiplier 55. Register 52 provides a SHIFT COUNT of 0, encoded on the four LSBs of the output of register 52 as 0000 binary, to the input of remapping circuit 54. Because it is a left shift, signal LEFT is active and signals RIGHT and BYPASS are inactive. 4-bit exclusive-OR circuit 60 passes each bit unaltered to provide a CORRECTED SHIFT COUNT value of 0, or 0000 binary, to the input of decoder 61. Decoder 61 then provides a value of 0000000000000001 binary ($0001) as the DECODED SIGNAL. In response to the activation of signal LEFT, multiplexer 62 selects the second input thereof, and provides a value of $0000 as the REMAPPED SIGNAL to the multiplier input of multiplier 55. Multiplier 55 then passes the value of $8421 through to the output in response to signal SHIFT0 to provide a value of $FFFF 0842, which becomes a 40-bit value of $FF FFFF 0842 in accumulation adder 56. Output shifter 57 then passes this value one bit to the left in response to signal SHIFT0 being active. Thus, a value of $8421 is aligned into bits 31:16 of register 58, which is the expected SHIFT RESULT.

Figure 5:
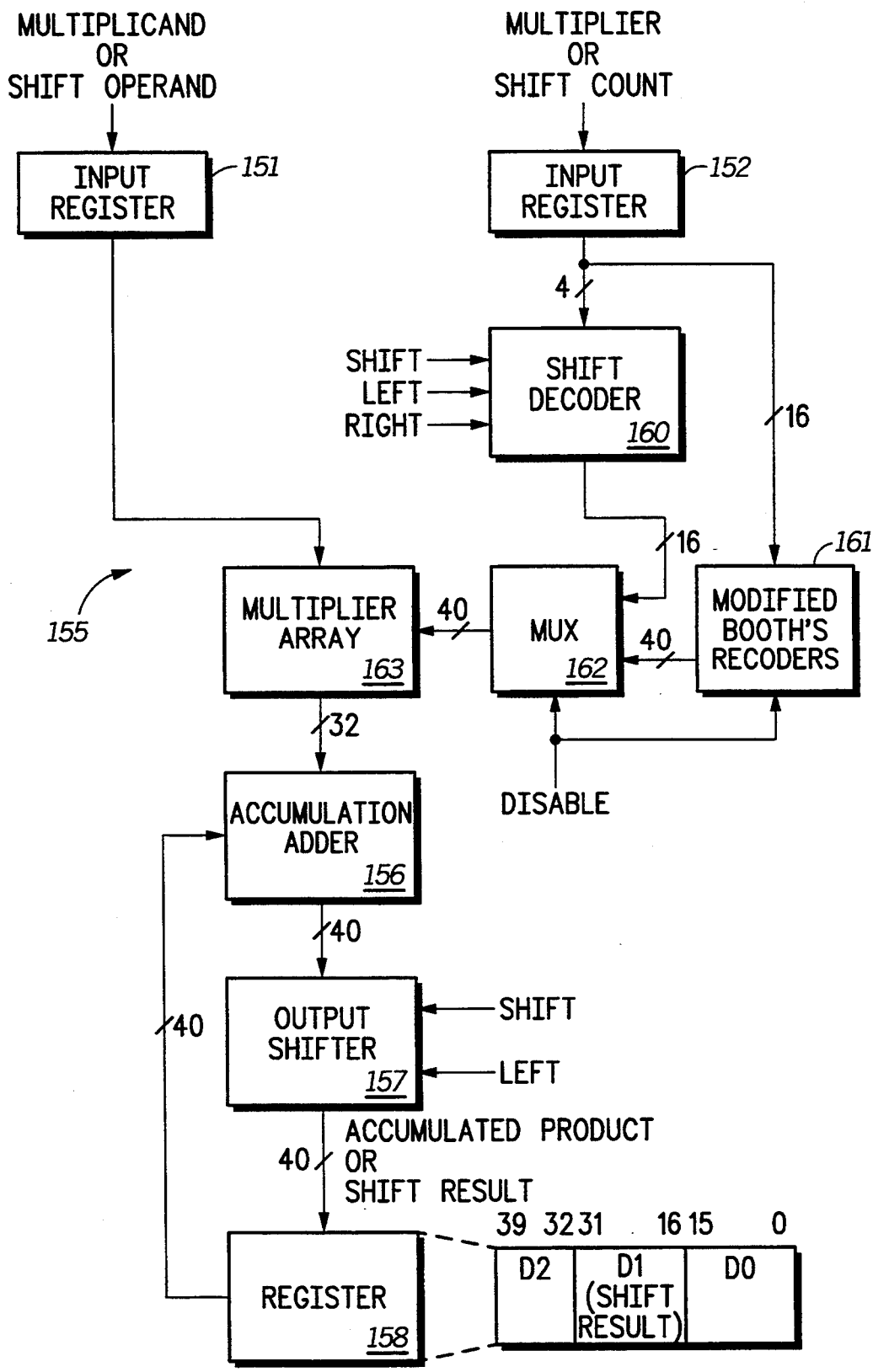
FIG. 5 illustrates in block diagram form an ALU according to a second embodiment of the present invention.

FIG. 5 illustrates in block diagram form an ALU 150 according to a second embodiment of the present invention. ALU 150 includes two input registers 151 and 152 for receiving input data. Input register 151 receives a data element referred to as "MULTIPLICAND" during a multiplication operation or "SHIFT OPERAND" during a shift operation. Input register 152 receives a data element referred to as "MULTIPLIER" during a multiplication operation or "SHIFT COUNT" during a shift operation. In the illustrated embodiment, ALU 50 operates on 16-bit data words, and thus registers 151 and 152 are each 16-bit registers. A multiplier 155 has a first (multiplicand) input connected to the output of register 151, a second (multiplier) input connected to the output of register 152, and an output for providing a 32-bit product.

Multiplier 155 is a 16-by-16 array multiplier. Specifically, multiplier 155 is a modified Booth's multiplier which sums partial products through a carry/save adder tree. However, other types of array multipliers are possible, such as one which sums partial products through a Wallace Tree. The important consideration is that multiplier 155 is relatively fast: for the illustrated example, multiplier 155 provides a product of a first input and a second input thereof within one clock cycle of data processor 40 of FIG. 2. For example, if data processor 40 uses a 60 megahertz (MHz) clock, multiplier 155 resolves a product within 16 nanoseconds (ns). Multiplier 155 has a 16-bit multiplicand input terminal coupled to an output terminal of register 51, a 16-bit multiplier input terminal coupled to an output terminal of register 152, and a 32-bit output terminal for providing a product of the multiplier and multiplicand inputs. The difference between the multiplier and multiplicand input terminals is that the multiplier input terminal receives the operand that is subject to modified Booth's recoding.

Multiplier 155 includes generally a shift decoder 160, modified Booth's recoders 161, a multiplexer (MUX) 162, and a multiplier array 163. Shift decoder 160 has an input for receiving the four least significant bits (LSBs) of the output of register 152, a first control input for receiving a control signal labelled "SHIFT", a second control input for receiving a control signal labelled "LEFT", a third control input for receiving a control signal labelled "RIGHT", and a 16-bit output. Signal SHIFT is active to indicate that a shift operation is to be performed. Signal LEFT is active to indicate that the shift to be performed is a left shift. Signal RIGHT is active to indicate that the shift to be performed is a right shift. In one embodiment, signals LEFT and RIGHT may be combined into a single signal designated "LEFT/RIGHT" which is active at a logic high to indicate a left shift and inactive at a logic low to indicate a right shift.

In response to signal SHIFT being active, shift decoder 160 performs two translations. First, shift decoder 160 demultiplexes the four LSBs of the SHIFT COUNT stored in register 152 into a 16-bit demultiplexed value. The 16-bit demultiplexed value includes only one active bit, represented by a binary one, and fifteen inactive bits, represented by binary zeros. The active bit is in a bit position corresponding to both the shift count and the shift direction, as will be further described below.

Second, shift decoder 160 recodes overlapping groups of three demultiplexed bits into recoded signals indicative of modified Booth's recoding. Shift decoder 160 uses the property that the demultiplexed value contains only one active bit to provide a recoding which is a subset of normal modified Booth's recoding. In the illustrated embodiment, ALU 150 operates on 16-bit data words. Thus, shifts of between 0 and 15 bits are allowed. Shift decoder 160 then recodes each of eight overlapping groups of three bits. Instead of providing signals to represent the five modified Booth's recoding states (0, +1, −1, +2, and −2), shift decoder 160 provides signals to represent only three states: 0, +1, and +2. These three states are encoded in two signals, designated R1(i) and R2(i), where the subscript i refers to the number of the overlapping group. For the case of a 16-bit multiply, there are eight rows in multiplier array 163 corresponding to eight overlapping groups (i=1 to 8), and thus shift decoder 160 provides a total of sixteen signals. The outputs corresponding to the allowable SHIFT COUNTS are listed in TABLE III below:

TABLE III

| SHIFT COUNT | MULT. VALUE RIGHT SHIFT | ACTIVE SIGNAL RIGHT SHIFT | MULT. VALUE LEFT SHIFT | ACTIVE SIGNAL LEFT SHIFT |
|---|---|---|---|---|
| $0 | $0000 | R2(8) | $0001 | R1(1) |
| $1 | $4000 | R1(8) | $0002 | R2(1) |
| $2 | $2000 | R2(7) | $0004 | R1(2) |
| $3 | $1000 | R1(7) | $0008 | R2(2) |
| $4 | $0800 | R2(6) | $0010 | R1(3) |
| $5 | $0400 | R1(6) | $0020 | R2(3) |
| $6 | $0200 | R2(5) | $0040 | R1(4) |
| $7 | $0100 | R1(5) | $0080 | R2(4) |
| $8 | $0080 | R2(4) | $0100 | R1(5) |
| $9 | $0040 | R1(4) | $0200 | R2(5) |

TABLE III-continued

| SHIFT COUNT | MULT. VALUE RIGHT SHIFT | ACTIVE SIGNAL RIGHT SHIFT | MULT. VALUE LEFT SHIFT | ACTIVE SIGNAL LEFT SHIFT |
|---|---|---|---|---|
| $A | $0020 | R2(3) | $0400 | R1(6) |
| $B | $0010 | R1(3) | $0800 | R2(6) |
| $C | $0008 | R2(2) | $1000 | R1(7) |
| $D | $0004 | R1(2) | $2000 | R2(7) |
| $E | $0002 | R2(1) | $4000 | R1(8) |
| $F | $0001 | R1(1) | $0000 | R2(8) |

In parallel to shift decoder 160, modified Booth's recoders 161 perform standard modified Booth's recoding (i.e., signals indicating 0, +1, −1, +2, and −2 states) on overlapping groups of three signals of the operand stored in register 152. Note that because the operand stored in register 152 is sixteen bits, both shift decoder 160, and modified Booth's recoders 161, recode a first group having a first input forced to a logic low level (corresponding to a binary "0", bit 0, and bit 1). The next group recodes bits 1, 2, and 3, and so on until the last group, which recodes bits 13, 14, and 15.

A multiplexer (MUX) 162 then selects one of these groups of signals depending on the type of operation, using a control signal labelled "DISABLE". During the multiply mode, signal DISABLE is inactive at a logic low, and MUX 162 selects the output of modified Booth's recoders 161 to provide to multiplier array 163. During the shift mode, signal DISABLE is active at a logic high to select the output of shift decoder 160 to provide to multiplier array 163. Signal DISABLE also indicates other conditions in which modified Booth's recoders 161 are to be disabled to further save power.

Multiplier array 163 has a multiplier input connected to the output of register 151, a recoded signal input connected to the output of MUX 162, and a 32-bit output. Multiplier array 163 includes eight rows of partial sums, which are derived from multiplexing the multiplicand using the recoded signals provided by MUX 162. The partial sums are then summed in a high-speed carry save adder to provide a 32-bit product.

Data processor 40 of FIG. 2 is a digital signal processor (DSP). In digital signal processing algorithms, such as finite impulse response (FIR) filters, infinite impulse response (IIR) filters, fast Fourier transforms (FFTs), and the like, it is helpful to have the capability to perform a multiply-and-accumulate (MAC) instruction using hardware. For this purpose, ALU 150 includes an accumulator 156 which accumulates sums of products for such instructions. Accumulator 156 has a 32-bit input terminal connected to the output terminal of multiplier 155, a second, 40-bit input terminal, and an output terminal for providing a 40-bit accumulated output. In order to accommodate accumulations which cannot be represented in 32 bits, accumulator 156 includes an eight most significant bits (MSBs) as guard bits.

The 40-bit output of accumulator 156 is then provided to an output shifter 157, which in turn provides a 40-bit output to a register 158. Output shifter 157 has a 40-bit input connected to the output of accumulator 156, a first control input for receiving control signal SHIFT, a second control input for receiving a control signal LEFT, and a 40-bit output. During a shift operation, bits 31:16 of register 158 hold a final SHIFT RESULT. Output shifter 157 includes a shift-by-15 function which is operative in response to control signals SHIFT and LEFT to align the result into bits 31:16. Output shifter 157 sets bits 15:0 to zero. For a right shift, the 40-bit output of accumulator 156 is written directly into register 158 and the sign is automatically extended. The most significant bit (MSB) of the result, at bit 31, is sign-extended into the upper eight bit positions of output shifter 157.

Register 158 has three fields including an upper 8-bit field containing bits 40-32 labelled "D2", a more-significant 16-bit field containing bits 31-16 labelled "D1", and a less-significant 16-bit field containing bits 15-0 labelled "D0". The D1 field includes the 16-bit SHIFT RESULT during both left and right shifts. D2:D1:D0 represents an "ACCUMULATED PRODUCT" during multiply operations. Register 158 has a 40-bit input connected to the output terminal of output shifter 157, and a 40-bit output terminal connected to the second, 40-bit input terminal of accumulator 156. Register 158 also includes connections to the input of registers 151 and 152, which are omitted from FIG. 3.

ALU 150 accomplishes both left shifts and right shifts for shift values between 0 to 15 using existing circuitry in high-speed multiplier 155. Thus, ALU 150 avoids the need for a dedicated shifter such as a high-speed barrel shifter. ALU 150 provide other advantages. First, ALU 150 performs shift instructions quickly because shift decoder 160 performs its functions in parallel with modified Booth's recoders 161. This parallelism decreases delay enough to allow shift operations to be performed within one clock period of data processor 40, for example, within 16 ns for a 60 MHz clock signal. Second, ALU 150 operates with reduced power because shift decoder 160 provides recoded signals which are a subset of conventional modified Booth's encoding. Since shift decoder 160 only activates a single recoded signal, fewer rows of multiplier array 163 are activated, saving power. In addition, signal DISABLE deactivates modified Booth's recoders 161, further saving power during the shift mode. Third, ALU 150 eliminates the need for zero detect circuit 63.

Generally, shift decoder 160 includes combinational logic which, overall, performs two translations. Shift decoder 160 performs these two translations in parallel in a single stage of decoding so that the two translations are indistinguishable. Combining these two translations allows shift decoder 160 to reduce the propagation delay and number of gates below a circuit performing such translations separately.

However, it is still helpful to analyze the two translations as if they were performed separately to aid understanding of the function of shift decoder 160. The first translation is to decode the 4-bit encoded SHIFT COUNT into a demultiplexed (remapped) value, as illustrated in TABLE IV below:

TABLE IV

| SHIFT COUNT | DEMULTIPLEXED VALUE RIGHT SHIFT | DEMULTIPLEXED VALUE LEFT SHIFT |
|---|---|---|
| 0 | $0000 | $0001 |
| 1 | $4000 | $0002 |
| 2 | $2000 | $0004 |
| 3 | $1000 | $0008 |
| 4 | $0800 | $0010 |
| 5 | $0400 | $0020 |
| 6 | $0200 | $0040 |
| 7 | $0100 | $0080 |
| 8 | $0080 | $0100 |
| 9 | $0040 | $0200 |
| 10 | $0020 | $0400 |
| 11 | $0010 | $0800 |
| 12 | $0008 | $1000 |

TABLE IV-continued

| SHIFT COUNT | DEMULTIPLEXED VALUE RIGHT SHIFT | DEMULTIPLEXED VALUE LEFT SHIFT |
|---|---|---|
| 13 | $0004 | $2000 |
| 14 | $0002 | $4000 |
| 15 | $0001 | $0000 |

The second translation takes the demultiplexed (re-mapped) value and performs a subset of modified Booth's recoding on overlapping groups of three bits, as shown in TABLE V below:

TABLE V

| SEQUENCE OF BITS | MODIFIED BOOTH'S VALUE | SHIFT DECODER 160 VALUE |
|---|---|---|
| 000 | 0 | 0 |
| 001 | 1 | 0 |
| 010 | 1 | 1 |
| 100 | −2 | 2 |

Note that this translation is different than conventional modified Booth's recoding. For a shift operation, unlike an ordinary multiplication, the decoded shift count includes only a single "1" which is indicative of the amount to be shifted. Taking advantage of this characteristic, shift decoder 160 recodes the sequences 001 and 100 differently than conventional modified Booth's recoding. The reason for this difference is that when there is a "1" in the MSB position following by two "0"s in the three bit sequence, a known modified Booth's recoder does not know how many "1"s preceded it. Thus, the known modified Booth's recoder assigns values of 1 and 2 for the 001 and 011 sequences, respectively. However, in shift decoder 160, there is no need to activate two recoded signals because the length of the string of "1"s is known and is one, and hence, the "1" is in the LSB location of the sequence (overlapping the prior group) and it is ignored as it would have been decoded by the row preceding it as a value of 2. The combinatorial logic functions of demultiplexer 180 and recoder 181 are preferably implemented in combined circuitry using conventional logic simplification techniques.

Figure 6:
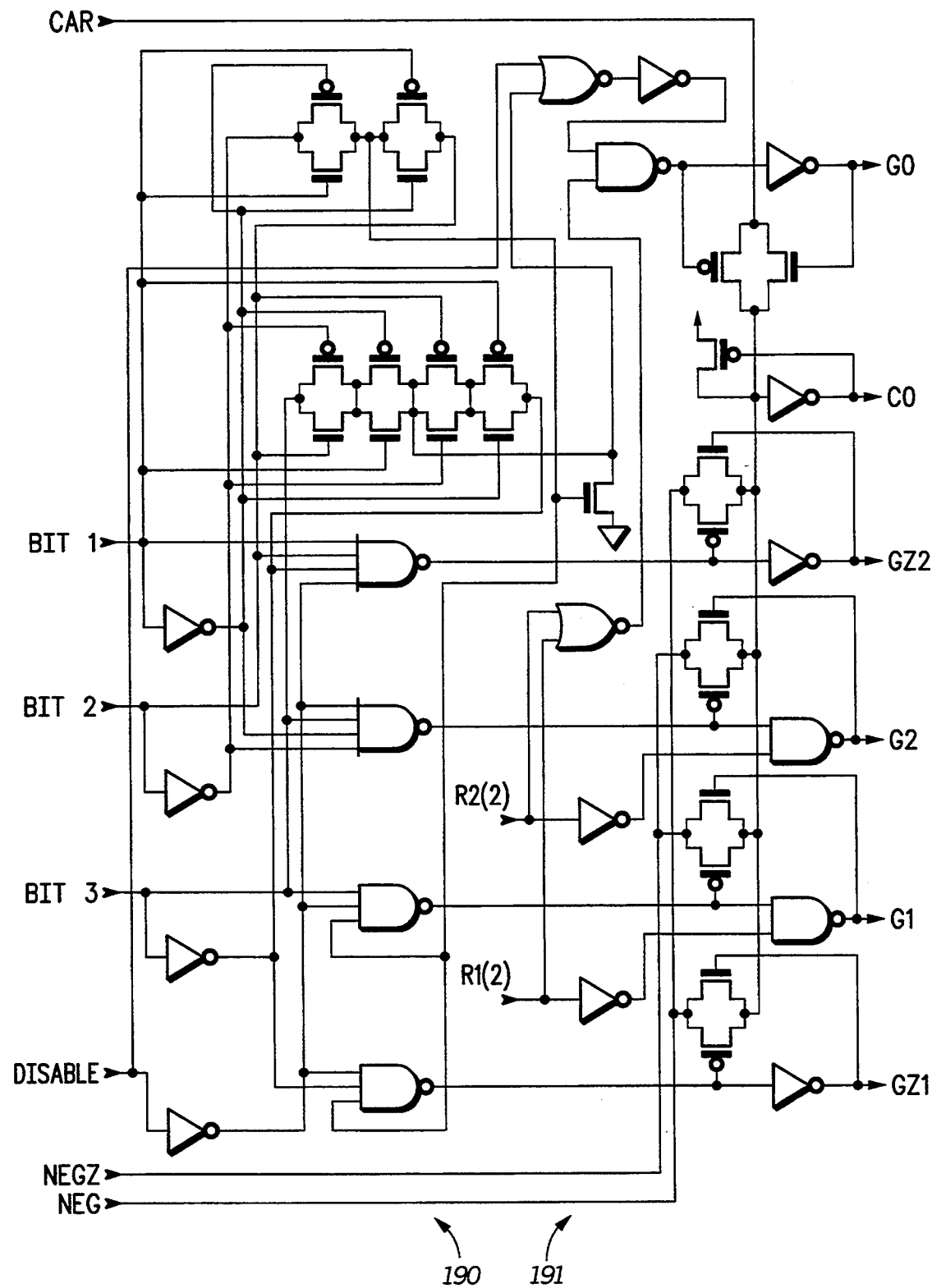
FIG. 6 illustrates in partial logic diagram and partial schematic form the modified Booth's recoder and MUX of FIG. 5.

FIG. 6 illustrates in partial logic diagram and partial schematic form a portion 190 modified Booth's recoders 161 of FIG. 5 and a portion 191 of MUX 162 of FIG. 5. Additional signals used to implement portions 190 and 191 include a carry input signal labelled "CAR", a carry output signal labelled "CO", a control input signal labelled "NEG" which indicates that the result of the multiplication, will be negative (i.e., only one of the multiplier and multiplicand is negative) and its complement labelled "NEGZ".

Note also that portion 190 performs conventional modified Booth's recoding; however it should be apparent that multibit shifters according to the present invention may be constructed using other recoding schemes as well. Portion 191 provides recoded signals from either portion 190 in the multiply mode, or outputs of shift decoder 160 in the shift mode, depending on whether signal DISABLE indicates a multiply or a shift operation. The circuitry illustrated in FIG. 6 is then repeated for each of the eight groups of recoded signals. Note that FIG. 6 just one possible circuit implementation of these portions of multiplier 155; other circuit implementations are possible, such as ones using different active-level control signals, different recoding schemes, different types of transistors, etc.

While the invention has been described in the context of a preferred embodiment, it will be apparent to those skilled in the art that the present invention may be modified in numerous ways and may assume many embodiments other than that specifically set out and described above. For example, in other embodiments, the multiplicand input register could receive a shift count which is already represented in one-of-N format. In that case, the shift decoder need not perform that decoding step. Also, a shift apparatus according to the present invention could use other recoding schemes than modified Booth's as well. The multiplier/shifter may be included in an ALU of a complex instruction set computer (CISC) microprocessor, a reduced instruction set computer (RISC) microprocessor, a DSP, a microcontroller, or any other type of data processor. Also, the multiplier/shifter may be part of an integrated circuit data processor, or may be implemented discretely. Accordingly, it is intended by the appended claims to cover all modifications of the invention which fall within the true spirit and scope of the invention.

We claim:

1. A combined multiplier/shifter, comprising:
   a first register for receiving a first operand, said first operand being a multiplicand in a multiply mode, and a shift operand in a shift mode;
   a second register for receiving a second operand, said second operand being a multiplier in said multiply mode, and a shift count in said shift mode;
   a shift decoder having a first input coupled to said second register, a second input for receiving a shift direction signal, and an output for providing a plurality of decoded output signals in response to predetermined bits of said second operand and to said shift direction signal;
   a recoder having an input coupled to said second register, and an output for providing a first plurality of recoded output signals responsive to said second operand;
   at multiplexer having a first input coupled to said output of said shift decoder, a second input coupled to said output of said recoder, a control input receiving a control signal, and an output, said control signal causing said multiplexer to select said first input in said shift mode and said second input in said multiply mode; and
   a multiplier array having a multiplicand input coupled to said first register, a multiplier input coupled to said output of said multiplexer, and an output for providing a first output of the combined multiplier/shifter,
   whereby said first output of the combined multiplier/shifter represents a product of said multiplier and said multiplicand in said multiply mode, and said shift operand shifted by an amount determined by said shift count in said shift mode.

2. The combined multiplier/shifter of claim 1 further comprising an output shifter having an input coupled to said output of multiplier array, a control input for receiving a second shift direction signal, and an output for providing a second output of the combined multiplier/shifter, said output shifter shifting said first output of the combined multiplier/shifter by a predetermined number of bit positions selectively in response to said second shift direction signal in said shift mode.

3. The combined multiplier/shifter of claim 1 wherein said shift decoder forms a remapped signal being a multiple of two as determined by both said shift count and said shift direction signal, and recodes said remapped signal to provide a second plurality of recoded output signals as said plurality of decoded output signals.

4. The combined multiplier/shifter of claim 3 wherein said shift count is characterized as being encoded, and wherein said shift decoder decodes said shift count by performing one-of-N decoding thereon to provide a decoded shift count, and remaps said decoded shift count as a multiple of two as determined by both said shift count and said shift direction signal.

5. The combined multiplier/shifter of claim 3 wherein said second plurality of recoded output signals indicates fewer recoding states than said first plurality of recoded output signals.

6. The combined multiplier/shifter of claim 3 wherein said recoder and said shift decoder each performs recoding on overlapping groups of three input signals, and wherein said recoder performs modified Booth's recoding.

7. The combined multiplier/shifter of claim 6 wherein said recoder recodes 0, +1, +2, −1, and −2 states for each of said overlapping groups of three input signals.

8. The combined multiplier/shifter of claim 6 wherein said shift decoder recodes only 0, +1, and +2 states for each of said overlapping groups of three input signals.

9. A combined multiplier/shifter, comprising:
a first input for receiving a first operand, said first operand being a multiplicand in a multiply mode, and a shift operand in a shift mode;
a second input for receiving a second operand, said second operand being a multiplier in said multiply mode, and a shift count in said shift mode;
a first recoding circuit coupled to said second input and responsive to a plurality of groups of bits of said second operand and providing a corresponding plurality of first groups of recoded signals, each first group of recoded signals indicating one of a first predetermined number of recoding states determined by values of corresponding bits of said second operand;
a second recoding circuit coupled to said second input and responsive to said plurality of groups of bits of said second operand and providing a second corresponding plurality of groups of recoded signals, each second group of recoded signals indicating one of a second predetermined number of recoding states determined by values of corresponding bits of said second operand;
said second predetermined number being less than said first predetermined number; and
a multiplier array having a multiplicand input for receiving said first operand, a multiplier input for receiving either said plurality of first groups recoded signals in said multiply mode, or said plurality of second groups of recoded signals in said shift mode, and an output for providing a product of said first and second inputs thereof;
the combined multiplier/shifter providing said output of said multiplier array as a product of said multiplier and said multiplicand in said multiply mode, and as a first shift result in said shift mode.

10. The combined multiplier/shifter of claim 9 further comprising an output shifter having an input coupled to said output of said multiplier array, a control input for receiving a shift direction signal, and an output for either providing said product in said multiply mode, or shifting said first shift result by a predetermined number of bit positions selectively in response to said shift direction signal to provide a second shift result in said shift mode.

11. The combined multiplier/shifter of claim 9 wherein each of said first and second recoding circuits performs recoding on overlapping groups of three input signals, and wherein said first recoder performs modified Booth's recoding.

12. The combined multiplier/shifter of claim 11 wherein said first predetermined number is equal to five, and wherein said second predetermined number is equal to three.

13. The combined multiplier/shifter of claim 12 wherein each first group of recoded signals indicates a selected one of 0, +1, +2, −1, and −2 recoding states.

14. The combined multiplier/shifter of claim 12 wherein each second group of recoded signals indicates a selected one of only 0, +1, and +2 recoding states.

15. The combined multiplier/shifter of claim 9 further comprising:
a first register for receiving and storing said first operand; and
a second register for receiving and storing said second operand.

16. The combined multiplier/shifter of claim 9 further comprising a multiplexer having a first input coupled to said output of said first recoding circuit, a second input coupled to said output of said second recoding circuit, a control input for receiving a control signal, and an output coupled to said multiplier input of said multiplier array, said control signal causing said multiplexer to select said first input thereof in said multiply mode and said second input thereof in said shift mode.

17. A method for performing both multiply and shift operations using a multiplier array, comprising the steps of:
providing a first operand to a multiplicand input of the multiplier array, said first operand representing a multiplicand in a multiply mode and a shift operand in a shift mode;
receiving a second operand, said second operand representing a multiplier in said multiply mode and a shift count in said shift mode;
recoding said multiplier in said multiply mode to provide a first plurality of groups of recoded signals each indicating one of a first predetermined number of recoding states;
recoding said shift count in said shift mode to provide a second plurality of groups of recoded signals each indicating one of a second predetermined number of recoding states, said second predetermined number being less than said first predetermined number;
providing a third plurality of groups of recoded signals each indicating one of a third predetermined number of recoding states to a recoded signal input of the multiplier array in response to either said first plurality of groups of recoded signals in said shift mode, or said second plurality of groups of recoded signals in said multiply mode; and providing an output of the multiplier array as a product in said multiply mode and as a first shift result in said shift mode.

18. The method of claim 17 further comprising the step of shifting said first shift result by a predetermined number of bits positions selectively in response to a shift direction signal to provide a second shift result.

19. The method of claim 17 wherein said step of providing said third plurality of groups of recoded signals comprises the step of providing said third plurality of groups of recoded signals indicating one of 0, +1, −1, +2, and −2 recoding states, in response to either said first plurality of groups of recoded signals indicating 0, +1, −1, +2, and −2 recoding states in said multiply mode, or to said second plurality of groups of recoded signals indicating 0, +1, and +2 recoding states in said shift mode.

20. The method of claim 17 further comprising the step of disabling said step of recoding said multiplier in said shift mode.

* * * * *